United States Patent [19]

Markow

[11] 4,111,249

[45] Sep. 5, 1978

[54] BAND REINFORCED RADIAL TIRE

[75] Inventor: Edward G. Markow, Oakdale, N.Y.

[73] Assignee: Grumman Aerospace Corporation, Bethpage, N.Y.

[21] Appl. No.: 739,559

[22] Filed: Nov. 8, 1976

[51] Int. Cl.² .............................................. B60C 17/00
[52] U.S. Cl. .............................. 152/330 RF; 152/156; 152/158; 152/361 R
[58] Field of Search ........................ 152/156, 158, 5, 8, 152/9, 56, 198–200, 361 R, 361 DM, 330 RF, 353

[56] References Cited

U.S. PATENT DOCUMENTS

| 840,503 | 1/1907 | Marks | 152/200 |
|---|---|---|---|
| 927,355 | 7/1909 | Karlstrom et al. | 152/200 |
| 1,374,904 | 4/1921 | Carillon | 152/200 |
| 1,428,726 | 9/1922 | Warth | 152/200 |
| 1,440,974 | 1/1923 | Dornburgh | 152/200 |
| 2,146,942 | 2/1939 | Czerwin | 152/353 R |
| 2,826,233 | 3/1958 | Cooper | 152/361 R |
| 2,976,905 | 3/1961 | Beckadolph | 152/361 R |
| 2,982,328 | 5/1961 | Emanueli et al. | 152/361 R |
| 3,782,440 | 1/1974 | Depmeyer | 152/354 |
| 3,861,440 | 1/1975 | Ochiai et al. | 152/361 R |

Primary Examiner—Albert J. Makay
Assistant Examiner—Carl Rowold

[57] ABSTRACT

A resilient pneumatic tire which is reinforced by a radially stabilized compression element such that the vehicle on which the tire is mounted can be operated safely in an essentially normal manner regardless of the state of pressurization of the tire. The compression element can be a solid flexible band of high-strength metal or plastic, or can comprise a layered construction having at least a pair of concentric metal bands which have a resilient material sandwiched therebetween. The compression element is stabilized by radial means such as plies comprising radial cords or wires. The radial elements have freedom in shear with respect to one another and they share radial loads imposed on the compression element and tire such that they reinforce and stabilize the compression element and tire. Alternately, the radial stabilizing means can be radial rib-like elements cast or formed integrally in the sidewall of the tire. The radially stabilized band behaves as a supple tensile element when the tire is operated in a pressurized condition, but acts as a stabilized structural compressive element for unpressurized operation.

5 Claims, 12 Drawing Figures

BAND REINFORCED RADIAL TIRE

BACKGROUND OF THE INVENTION

Field of the Invention

The present invention relates to reinforced resilient pneumatic tires and, more particularly, to a vehicle tire reinforced by a solid annular band or an annular compression element which is stabilized by radial means in the tire casing.

SUMMARY OF THE INVENTION

This invention lies in the art of resilient pneumatic tires which are provided with means to permit them to be operated at reasonable speeds in a substantially normal manner irrespective of the state of pressurization of the tire. This capability is provided in the tire of this invention when pneumatic support is reduced or absent by means of an annular structural compression element which is stabilized by radial reinforcing means. A solid high-strength metal band fixed in place in the crown of the tire radially inward with respect to the tread can be utilized as the compression element. This band is stabilized by the radial means which behave in a manner similar to individual tensile spokes to provide load supporting strength such that the band is reinforced thereby. The tire of this invention can be completely depressurized and with a predetermined deflection that will range approximately 30 to 50% of the pressurized condition it will bear the weight of the vehicle such that it can be driven at reasonable speeds without an appreciable or dangerous degradation in its handling qualities or performance. Means can be provided on the vehicle to control remotely the state of pressurization of the tires so that the degree of inflation can be adjusted while the vehicle is being driven such that optimum performance can be provided under conditions such as, for example, off-the-road weak-soil operation.

In the tires of this invention, the annular compression element which reinforces the tire is stabilized by radial elements in the sidewalls of the tires. The radial elements can be one or more plies of radial textile cords or metal wires. Various tire constructions are known in the art that have a casing or carcass comprising one or more plies of weftless cord (or wire) fabric extending from bead to bead wherein the cords in each ply are substantially radial in orientation; i.e., the cords are oriented substantially normal to the beads and the crown centerline of the tire. In a monoply radial tire construction, the casing cords normally have a 90° bias angle; i.e., in the unshaped canvas they extend perpendicular to the planes of the beads. In a two-ply radial tire construction, the cords in each casing ply are usually oriented at oppositely disposed small angles of up to 10° with respect to the perpendicular to the bead planes, in which case the respective body plies are said to have oppositely disposed bias angles of 80° or greater (but less than 90°). In four-ply or heavier radial tire constructions, similar opposed orientation of the cords in successive body plies is usually employed. All of these casing or carcass constructions are contemplated within the scope and meaning of the expressions "radial" and "substantially radial" as used herein.

A tire constructed in accordance with the teachings of this invention has been tested in actual operation on a vehicle. The test tire comprised the carcass of a GR 78-15 radial tire with a solid 4.4-inch wide, 0.065-inch thick band of AISI 4130 steel heat treated to 180,000 psi, bonded in the crown of the casing underneath the tread. In this tire, the sidewall radial reinforcement elements were two plies comprising radial cords of polyester. Two plies of steel wire were used to reinforce the tread. The initial tests were run with the tire mounted on the left rear wheel of a 3395-pound passenger automobile. A number of test runs were made with the top speeds ranging between 45–50 mph and with tire pressures of 25, 12, 5, and 0 psi. Assessment of the effect of side loads of the tire when depressurized (0 psi) were made by steering the vehicle into relatively sharp "S" turns at 40 mph. No appreciable degradation in vehicle acceleration, braking, or handling characteristics was detected in any of the runs. No adverse structural or dynamic behavior was indicated even for operation over randomly distributed 2×4-inch blocks. A cornering coefficient 50 to 100 percent higher than conventional radial pneumatic tires that has been attained in tests gives evidence of the high steering authority provided by the tire of this invention.

OBJECTS OF THE INVENTION

A principal object of the invention, therefore, is to provide a reinforced pneumatic tire that has the compatibility of use in vehicles of a conventional tire yet which will enable the vehicle with which it is used to be operated safely at reasonable speeds after a blowout or other damage causing a partial or complete loss of pressurization.

Another object of the invention is to provide a resilient pneumatic tire having a radially stabilized annular reinforcing compression element or band in which the bending stiffness and centrifugal forces created by the band mass and the stability influence of the radial reinforcing means ensure safety against instability in the event of high-speed blowouts, particularly those occurring with coupled highway vehicles such as trucks and trailers or with aircraft during the landing or takeoff runs.

It is a further object of the invention to provide a reinforced pneumatic tire which has restrained carcass and tread motion at operational speeds such that the rolling resistance is lower than in conventional radial tires especially at low inflation pressures.

Yet another object of the invention to provide a pneumatic tire in which a large percentage of the load is carried in the elastic properties of a compression element reinforcement incorporated therein such that the added restraint to carcass motion (standing wave phenomenon) results in lower tire heating at higher speeds whereby high locomotion efficiency is achieved.

A related object of the invention is to provide adequate obstacle-accommodating suppleness in a reinforced pneumatic tire having high locomotion efficiency to permit it to negotiate effectively "pot holes" and related road and terrain hazards.

Yet another object of the invention to provide a puncture resistant pneumatic tire in which the compression element is a homogeneous band having an inherent lateral stiffness that furnishes a high resistance to side loads to provide high steering authority such that the margin of safety in operation is increased significantly thereby.

A further object of the invention is to provide a pneumatic tire that can be operated safely while unpressurized or under partial inflation such the tire "foot print" is elongated and the "bulldozing" resistance is reduced by the low entry angle into the soil so that superior weak-soil performance is obtained. It is a concurrent object to provide a reinforced pneumatic tire in which the design permits a selection to be made from a variety of high-strength materials for use in the reinforcing means and in which also a choice in the construction materials and dimensions of the reinforcing means can be made to thereby give a desirable uniform foot-print pressure at a given deflation level such that the weak-soil performance is enhanced.

An object of the invention is to provide a pneumatic safety tire of a superior performance which has substantially total puncture resistance from tread-contacting road hazards and which can be manufactured at a cost substantially lower than tires having an equivalent performance and whose design is compatible with conventional tire manufacturing processes and equipment.

Yet another object of the invention is to provide a low-cost puncture-resistant pneumatic tire whose reliability permits the elimination of the spare wheel and tire conventionally required in automobiles and in which the maintenance requirements are essentially the same as conventional pneumatic radial tires.

A further object of the invention is to provide a reinforced tire in which the dual use of the reinforcing means for both pressurized and unpressurized operation results in the attainment of the maximum efficiency in the structural elements.

Another object of the invention is to provide a puncture-resistant pneumatic tire whose design obviates the requirement for internally contacting tire elements and related internal lubrication means when operating depressurized whereby the complexity and heating problems encountered with conventional puncture-resistant tires are eliminated.

Other and further objects of the invention will become apparent from the detailed description of the invention given in the accompanying specification and drawings.

DESCRIPTION OF THE PRIOR ART

The concept of placing annular metal bands within or adjacent a tire carcass for the purposes of armoring the tire is well known in the art as evidenced by the tires disclosed by, for example, H. H. Holdaway (U.S. Pat. No. 1,345,777); E. Grill (U.S. Pat. No. 1,393,773); and W. H. Dornburgh (U.S. Pat. No. 1,440,974). The concept of using radial reinforcing means such as wires so that the shape of the tire is retained whether or not it is pressurized is also shown to be old by, for instance, A. Roque V (U.S. Pat. No. 3,238,988). However, there appears to be no showing in the prior art that there was an appreciation of the unique advantages that accrue in the stabilizing of an annular compression element by radial cords or wires that behave as individual spoke members.

In the prior art, the above-mentioned Holdaway and Grill disclose tire constructions in which annular reinforcing bands are reinforced by heavy fabric material in the sidewalls of the tire carcass. The biased orientation of the cords in the laminations of fabric in these constructions is used in an attempt to hold a circular tire form; however, because the fabric is highly shear resistant, it results in a tire in which the stiffness of the sidewalls and other characteristics defeat the objects of the designs. A biased fabric sidewall construction differs significantly in operation from the radial reinforcing elements of the subject invention in which the desire is not to retain a circular form but a condition in which the annular band provides a bending structural curve of gentle tangency at the region where the tire meets the road rather than the relatively sharp bend in the tire at the road surface that results if an attempt is made, as in Holdaway and Grill, to maintain the tire in the circular shape. The radial reinforcing elements of the tire of the subject invention function with the annular compression element or band such that the tire runs with a bending structural curve at the road or ground surface to thereby provide a practical, workable tire having operating characteristics long sought in the art. The inherent shear flexibility between the individual elements of the radial reinforcements of the annular band of the subject design results in a tire whose performance is significantly different from a tire in which the annular reinforcing band is reinforced with highly shear resistant fabric such as of the characteristic bias-type conventional tires.

In the prior art, steel-belted radial tires having radial sidewall plies and annular belts comprising steel wires are also well-known. However, the steel belts of the prior art radial tires have a crucial drawback that limits them in that they cannot take any significant axial compression in the uninflated condition. Thus, if an attempt is made to run a conventional steel-belted tire after it has lost its inflation pressure, the handling characteristics of the vehicle upon which it is mounted will be unacceptable and the tire itself will be damaged or destroyed within a short time. In the subject invention, instead of the steel wire belts used in the prior art radial tires, a band of solid metal or other high-strength material which acts as a compressive element is used to reinforce the tire such that the band assumes a larger percentage of the load to thereby enable the tire to be operated substantially routinely in a low pressure or even an unpressurized condition.

DESCRIPTION OF THE DRAWINGS

For the purpose of illustrating the invention, there is shown in the drawings the forms which are presently preferred, it should be understood, however, that the invention is not necessarily limited to the precise arrangements and instrumentalities here shown.

DESCRIPTION OF THE PREFERRED EMBODIMENTS

Figure 1:
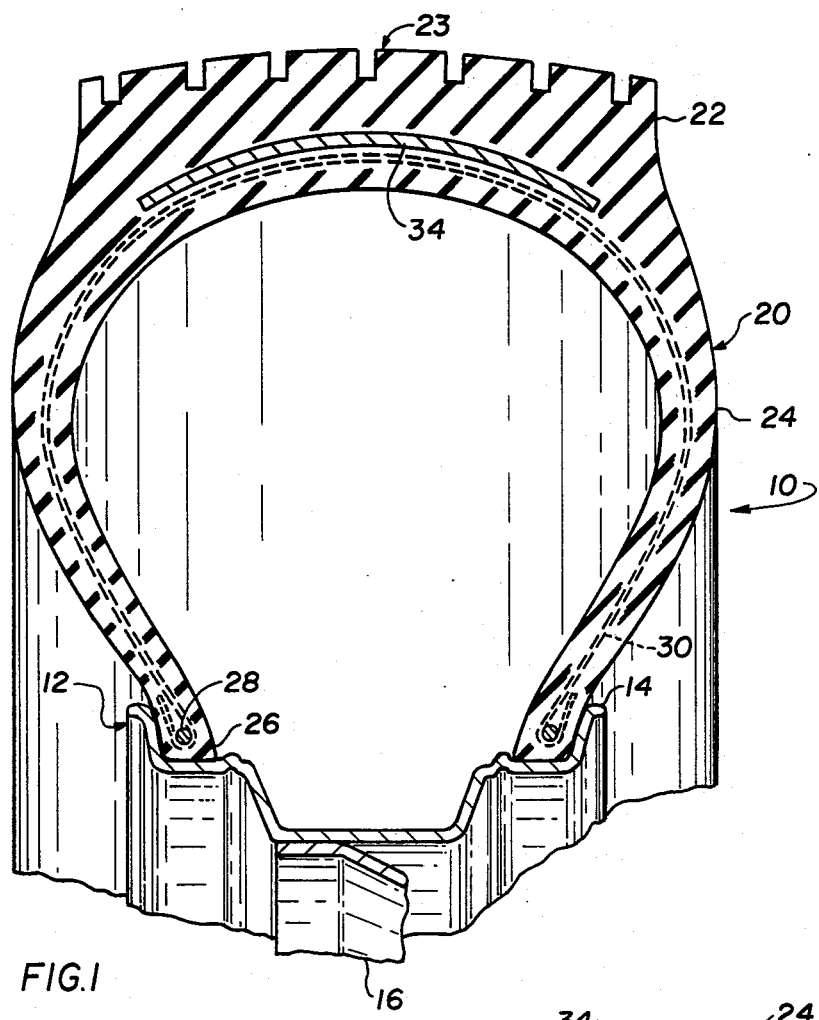
FIG. 1 is a sectional view of an embodiment of a tire of the invention which also shows in fragmentary section a wheel with which the tire is adapted to be used.
Figure 2:
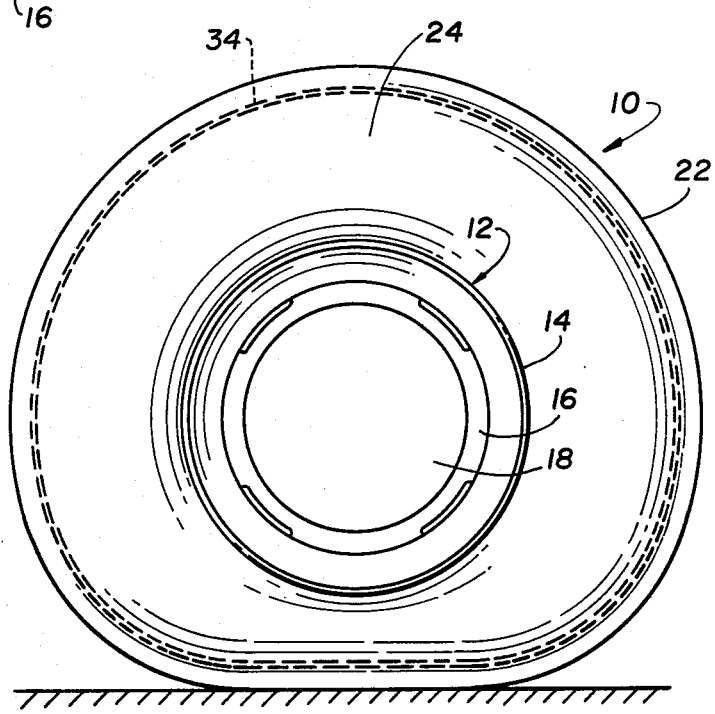
FIG. 2 is a side elevation of the tire embodied in FIG. 1 and an associated wheel.
Figure 5:
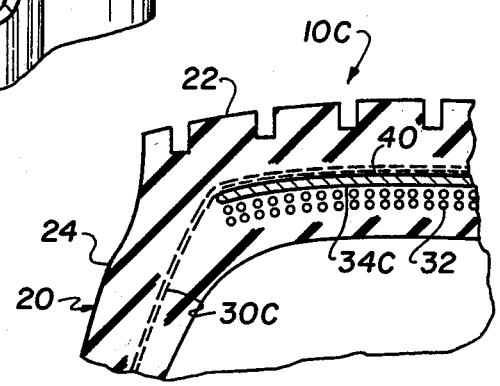
FIGS. 5, 6, and 7 are fragmentary sectional views of embodiments of tires of the invention.

Referring now to the drawings, FIG. 1 illustrates an embodiment of a tire 10 of the invention mounted on a wheel 12 which may be of a conventional type having a drop center rim 14 welded to a wheel body 16. As is well known, the wheel 12 may be provided with a wheel cover 18 (see FIG. 2). Tire 10 comprises a carcass or casing 20 having an outer peripheral tread portion 22 in the crown of the casing and sidewalls 24 extending on either side therefrom to beads 26 in the inside peripheral portions of the sidewalls. Tread 22 may be incised with the usual tread patterns or may be provided with cleats to improve tire traction or to serve other known considerations. Beads 26, which may be reinforced in a known manner with suitable annular cords or wires 28, are adapted to seat in an airtight relationship in the rim 14 of the wheel when the tire is mounted thereupon. The sidewalls 24 of the casing are reinforced by the usual known weftless radial elements 30 which may be of two-ply textile construction. As is known, the plies can be composed of fibers of rayon, nylon, polyester and the like or can be made with steel wires. Further reinforcement of the tire in the crown thereof can be provided by means of the usual annular belt or belts 32 (see FIG. 5) fabricated out of plies of suitable textile fibers or steel wires. The materials used in the fabrication of elements 30 can be used for belts 32. Cords of fiberglass or Kevlar (an aramid marketed by DuPont Company) are also suitable for use. When mounted on the wheel, tire 10 can be inflated through a regular rim valve (not shown) in the wheel in a well-known manner. High performance in off-the-road operation and during other operating conditions is achievable with the tire partially or totally unpressurized; optimum performance in other driving conditions may require full inflation pressure. Inasmuch as the tire of this invention may be operated substantially routinely in the pressurized or unpressurized state, it may be advantageous to employ a pressurization control system with which the inflation pressure of the tires can be controlled by the operator even when the vehicle is moving in operation. Such pressurization systems are well-known and form no part of this invention and will, therefore, not be shown. Located in the crown of the tire underlying the tread 22 thereof is an annular compression element or band 34 which is suitably integrated or bonded into the casing or body 20 of the tire. Band 34 may be fabricated out of a solid strip of any suitable high-strength metal or alloy or of a high-strength composite reinforced by a material such as graphite or Kevlar. High strength, in the context of the materials used in the annular compression element bands, is understood to mean materials having a tensile strength in the range of about 150 ksi and over. As shown in FIG. 1, band 34 can be designed with a curved cross-section having the convex side of the curvature facing radially outward. A curvature or crown of about 3/16-in. in a width of 6 inches has proved satisfactory in service.

In this invention, the stabilization of the annular compression element or band 34 by the radial reinforcing means 30 contributes importantly to the optimum results achieved in operation. A variety of structural materials can be used for the radial elements and the band; with respect to the design of the tire of this invention, however, I have had success using design parameters in the relationship $$(r^4 K_s / E_b I_b C_b) = M$$

In which:

$M = 10$ to $100$ $r = $ Outside radius of the undeflected tire $K_s = $ Radial spring rate equivalent of the unpressurized sidewall in lbs./in.

$E_b = $ Modulus of elasticity of the band $I_b = $ Moment of inertia of the band $C_b = $ Circumference of the band The product of the modulus of elasticity and the moment of inertia of the band cross-section should remain near constant. Increased values (up to 50%) have shown good results for the lower modulus ($3 - 5 \times 10^6$) materials. Values for $K_s$ typically range from about 200 to about 600 lbs./in.

Figure 3:
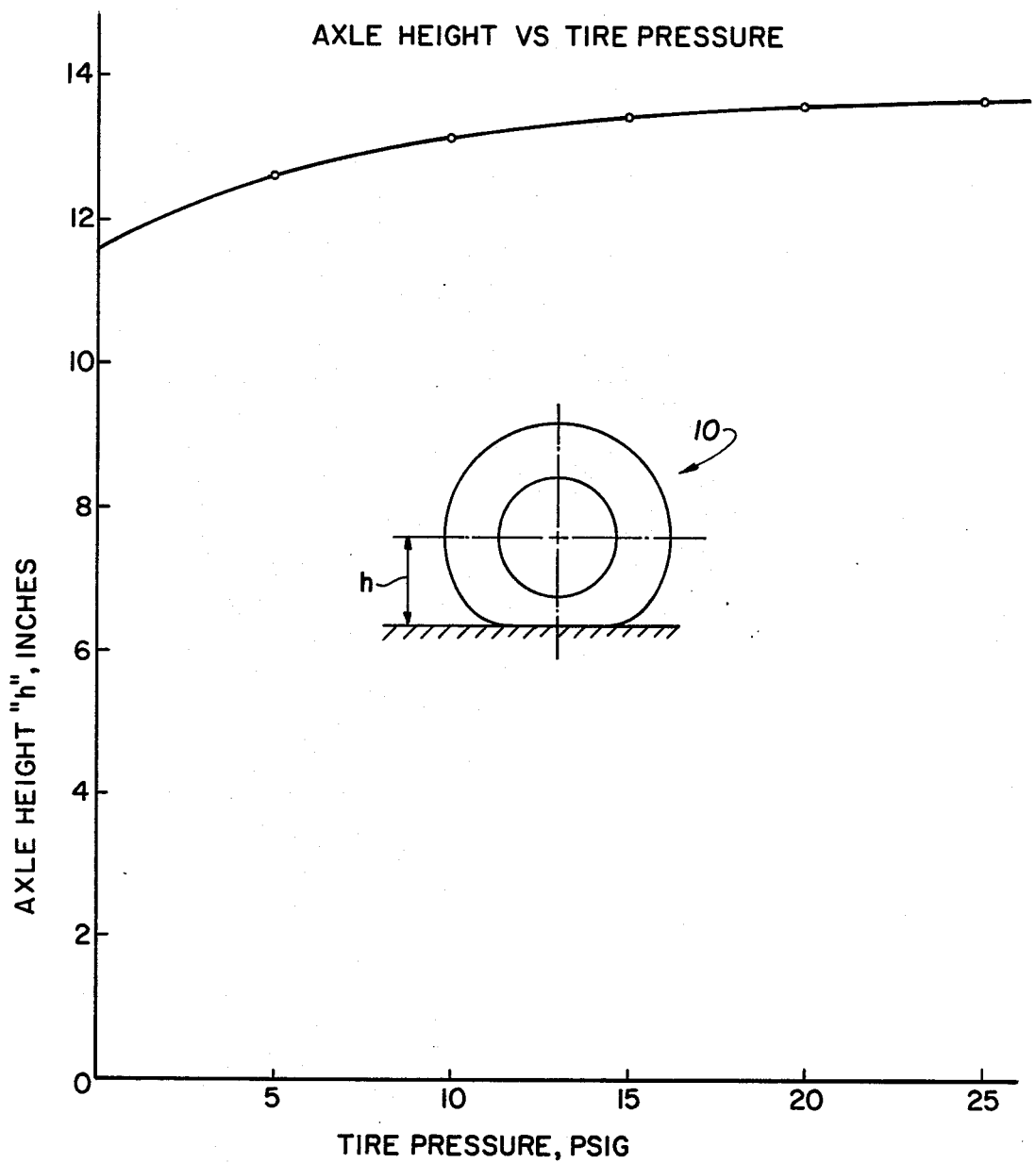
FIG. 3 is a plot of the axle height as a function of inflation pressure of a tire of the invention.

It should be pointed out that the lower values of the $(r^4 K_s / E_b I_b C_b)$ constant contribute a smaller change in ground contact and give a stiff reinforcing band, producing a "sprung hub" type of behavior. At higher values of the constant, ground contact is increased and the band shares a larger percentage of the load. It will be appreciated that at higher values of the constant the band will undergo higher bending stresses. Prestressing techniques for putting the unpressurized sidewall elements in tension has the effect of increasing the value of $K_s$ and thereby reducing a portion of the deflection of the tire. Variations in the thickness of the band change the foot print and other characteristics of the tire. By way of example, the axle height as a function of tire inflation pressure while mounted on a standard 3395-pound passenger automobile of an otherwise standard GR 78-15 radial tire having 2-ply polyester radial cord reinforcing elements which had been provided with a 0.060 gage 4130 steel band, heat treated to 180,000 psi, is shown in FIG. 3. During test runs of the vehicle with the tire uninflated, inner bead retention on the wheel rim appeared to be satisfactory operating with only the preload occurring due to rim geometry and the initial inflation when the tire was installed on the wheel. Additional techniques to assure that a bead lock is secured are well-known in the art and may comprise mechanical means, bonded elements, and the like, for increasing the adhesion between the wheel rim and tire bead.

Figure 4:
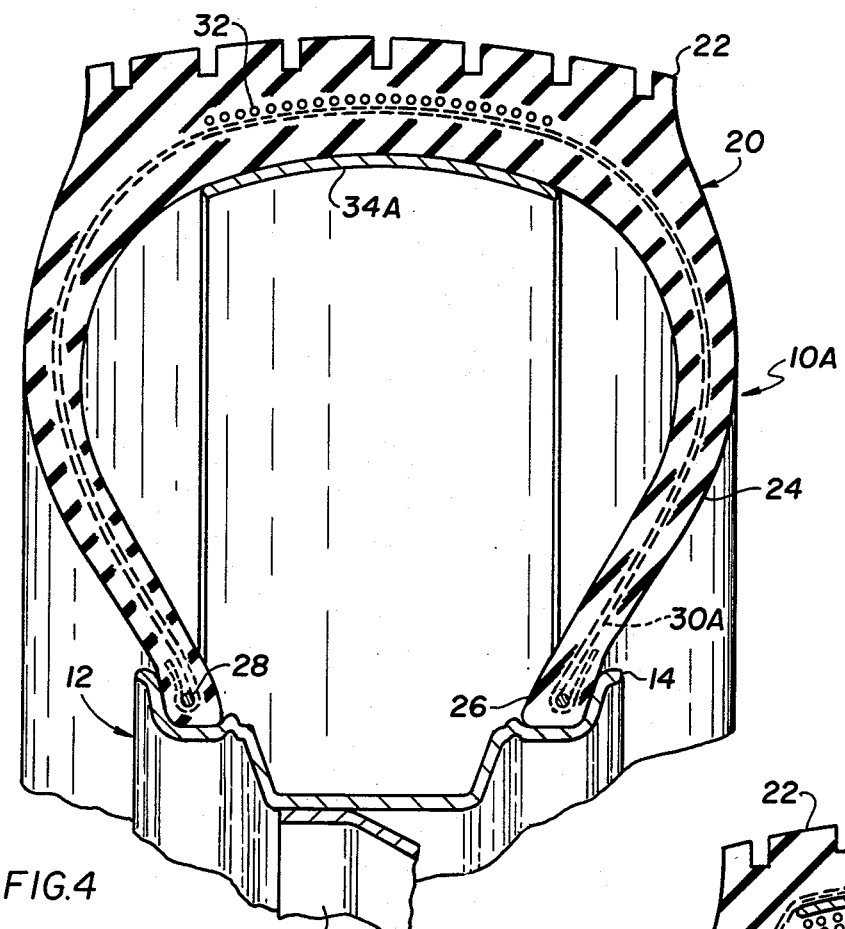
FIG. 4 is a sectional view of an embodiment of a tire of the invention showing in fragmentary section a wheel with which the tire is adapted to be used.

In the FIG. 1 embodiment of the invention, the annular reinforcing band is positioned as shown in the crown of the casing in the region underlying the tread. However, the annular band can be located elsewhere in the tire as, for example, in the inside casing thereof as illustrated in FIG. 4. In the FIG. 4 embodiment, tire 10A comprises a casing 20 having a tread portion 22 and sidewalls 24 extending therefrom to beads 26. The wheel 12 upon which the tire 10A is adapted to be mounted has the usual wheel body 16 having a drop-center rim 14 welded thereupon. Radial reinforcing cords or wires 30A extend from one bead of the tire across the crown and to the bead on the opposite side of the casing. In this embodiment the annular compression element or band 34A is bonded on the inside surface of the casing in the region of the tire radially inward of the tread 22. Band 34 can be constructed out of a length of 0.060–0.080-inch thick ribbon of 4130 high-strength steel whose ends are butt welded together or it can be fabricated of any other suitable high-strength material of appropriate thickness and width. For example, compression element 34A can be fabricated out of a solid annular band of composite materials comprising filaments or fibers of high-strength material such as graphite, fiberglass, Kevlar, and the like, embedded in a resin matrix. Fabrication of such composite annular bands can utilize filament winding techniques in which a filament of Kevlar, for instance, is wound on an elongated mandrel whose outside diameter is approximately the inside diameter of the finished band. A continuous filament is impregnated in the matrix material, which generally is an epoxy resin, and is wound on the mandrel. After curing, hoops or bands of the required width are sliced off the elongated process band. Filament winding techniques and the production of composites having filaments of high-strength material in a resin matrix are well-known and it is believed that it would serve no useful purpose to go into further or greater detail with respect thereto.

Generally, the width of the band used to reinforce the tires of this invention is not critical and can be substantially similar to the width of the steel wire belts used conventionally in radial steel-belted tires. The width of the band is conrolled by the width at the shoulder of the tire. We prefer a band width about ¾ of an inch narrower on each side than the shoulder for a standard size passenger car tire. Because a wider tire at the shoulder for a certain tire diameter permits the use of a thinner band, it will be recognized that a low-profile tire will give enhanced performance and operating behavior.

Figure 6:
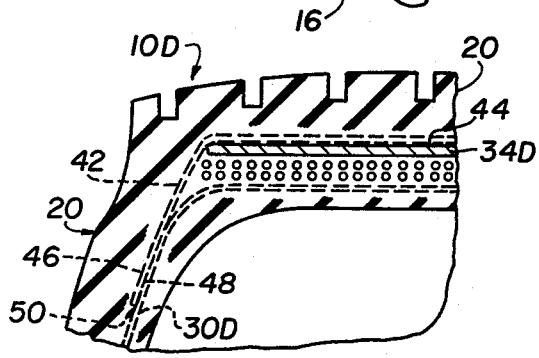

For the embodiments of the invention illustrated in FIGS. 1 and 4, the radial reinforcing elements extend from one bead of the tire across the crown and to the opposite bead. Configurations of that general design are common practice in the art for tires of the radial type. It will be appreciated, however, that the radial elements can be of a design in which they extend only part of the distance from bead to bead and can extend from the bead to a point, located, for example, in the crown of the casing. In addition, as shown in the embodiment illustrated in FIG. 5, the radial element 30C of tire 10C can extend from one bead (not shown) and sidewall 24 of tire 10C to the crown of the casing and across the outside surface 40 of reinforcing band 34C to the other sidewall and bead (not shown). A separate bonding step can be incorporated during the tire manufacturing process, if desired, to bond the radial elements 30C crossing the reinforcing band to surface 40 thereof. FIG. 6 illustrates a further embodiment of the invention. In this embodiment, a layer or ply 42 of suitable material such as fiberglass, for example, is bonded, using known techniques, to the outside surface 44 of the reinforcing band 34D of the casing 20 of tire 10D. The skirt portion 46 of ply 42 extending beyond the edges of band 34D can be bonded 48 to the outside surface 50 of the radial elements 30D.

Figure 7:
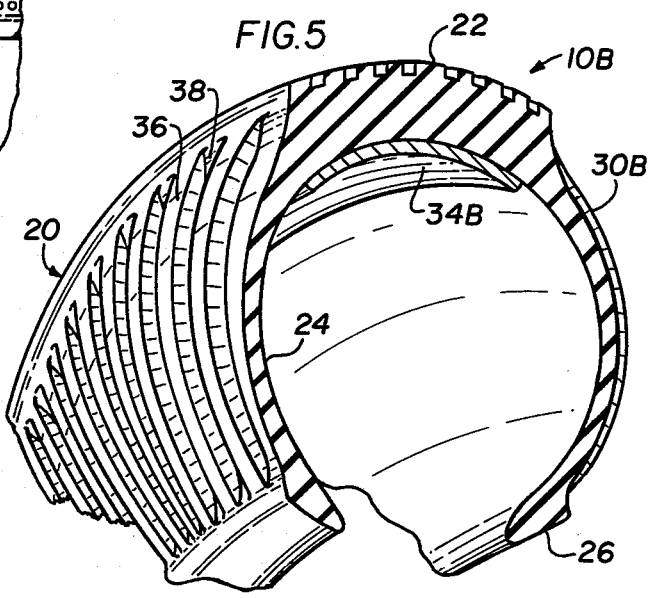

The radial reinforcing elements used to stabilize the annular band can be of constructions other than plies of radial cords or wires, providing that the elements supply the requisite radial reinforcement and have a high degree of flexibility in shear with respect to one another. One such construction is the cast tire embodiment 10B of FIG. 7 which has the usual casing 20 having a tread portion 22, sidewalls 24, and beads 26. The manufacture of tires by a casting technique is well-known in the art and, in the interests of brevity, a detailed description thereof will not be given herein. In the cast tire embodiment of this invention a pattern of radial elements 30B having raised ribs or lands 36 and depressed grooves or valleys 38 therebetween are cast in the sidewalls 24. It will be recognized that radial ribs (not shown) can be formed in the inside surface of sidewalls of the tire 10B in addition to or in the stead of ribs 36 on the outside surface. In this embodiment, the annular compression element 34B is suitably bonded to the inside surface of the casing in the region of the tire radially inward from tread portion 22.

Figure 8:
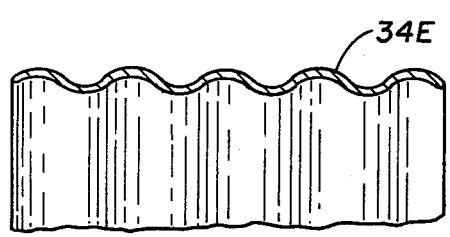
FIG. 8 is a fragmentary sectional view of an embodiment of a compression element of the tire of the invention.

It will be appreciated, of course, that the compression element embodied in the tires of this invention can be constructed not only of various high-strength materials, but it also can have configurations other than the arcuate cross-sections of FIGS. 1 and 4, for instance. The compression element can be, for example, the simple flat band 34D of FIG. 6, it can have a cross-section of variable thickness, it can be corrugated (34E, as shown in cross-section in FIG. 8), or it can be otherwise shaped. In addition, instead of forming the band by butt-welding the ends of a ribbon of appropriate length together, a ribbon of thin sheet material can be helically wound and suitably bonded to obtain a laminar band of the desired size.

Figure 9:
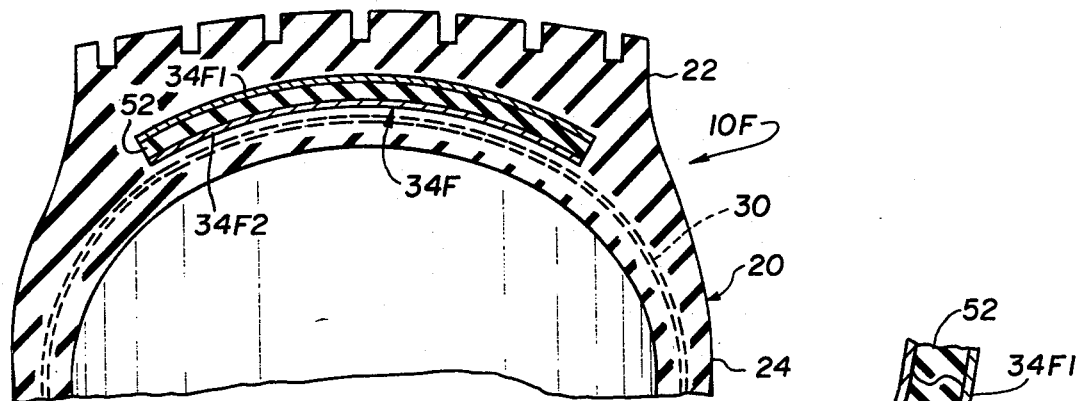
FIG. 9 is a fragmentary sectional view of an embodiment of the tire of the invention.

Each of the compression elements embodied in the tires of the invention illustrated in FIGS. 1–8 comprise a solid homogenous annular band of high-strength material. A further construction of the annular compression element is one having at least two concentric annular bands that have interposed between them a layer of resilient material such as the arrangement embodied in tire 10F. As shown in FIG. 9, tire 10F is essentially similar to the tire of FIG. 1 and it has a similar casing 20 tread portion 22, sidewalls 24, radial elements 30, and the like; however, the compression element 34F comprises an outer solid annular band 34F1 and, radially inwardly therefrom, an inner solid annular band 34F2. Interposed between the two annular bands and bonded to the surfaces thereof facing one another is a layer of resilient material 52. Material 52 may be composed of any suitable elastomeric well-known in the art and may be made of rubber used in the tire casing itself. The annular bands themselves can be made of any high-strength material of appropriate thickness and width for the loads that will be undergone. As stated previously, the width generally will be governed by the width of the tire itself at the shoulder. The thickness will be governed by the strength requirements and the like and will generally range between about 0.0156 to about 0.0938 inches.

In operation with tire 10F in a high or inflated condition, the tire and the compression element 34F contained therein will run with substantially small departures from the concentric, circular form and the tire behaves, more or less, as if the compression element were not present. When the tire is in substantially circular shape, the outer and inner bands (34F1 and 34F2, respectively) and elastomeric layer 52 therebetween of the compression element will be in a relatively unstressed condition and the bands will behave as individual flexural elements. However, when the tire is in a low pressure or unpressurized state, there is a significant departure from the circular state as the tire deflects under compression in contacting the road or ground surface. This departure from the original circular shape causes a relative movement between the outer and inner bands which is resisted by the elastomeric layer 52 (as indicated by lines 53), setting up a stress condition such that the bands behave as cap elements of a composite beam to thereby stiffen the compression element 34F. It will be appreciated, of course, that this stiffening of the compression element when the tire is underinflated or totally deflated serves to accentuate the proportion of the load the compression element helps carry and this contribution permits operation in that condition without adverse effects.

Figure 11:
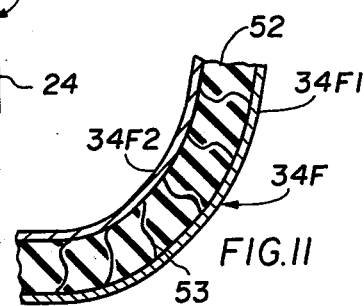
FIGS. 10 and 11 are fragmentary cross-sectional representations of the compression element of the FIG. 9 embodiment of the tire of the invention.
Figure 10:
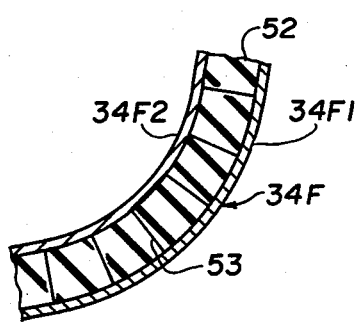
Figure 12:
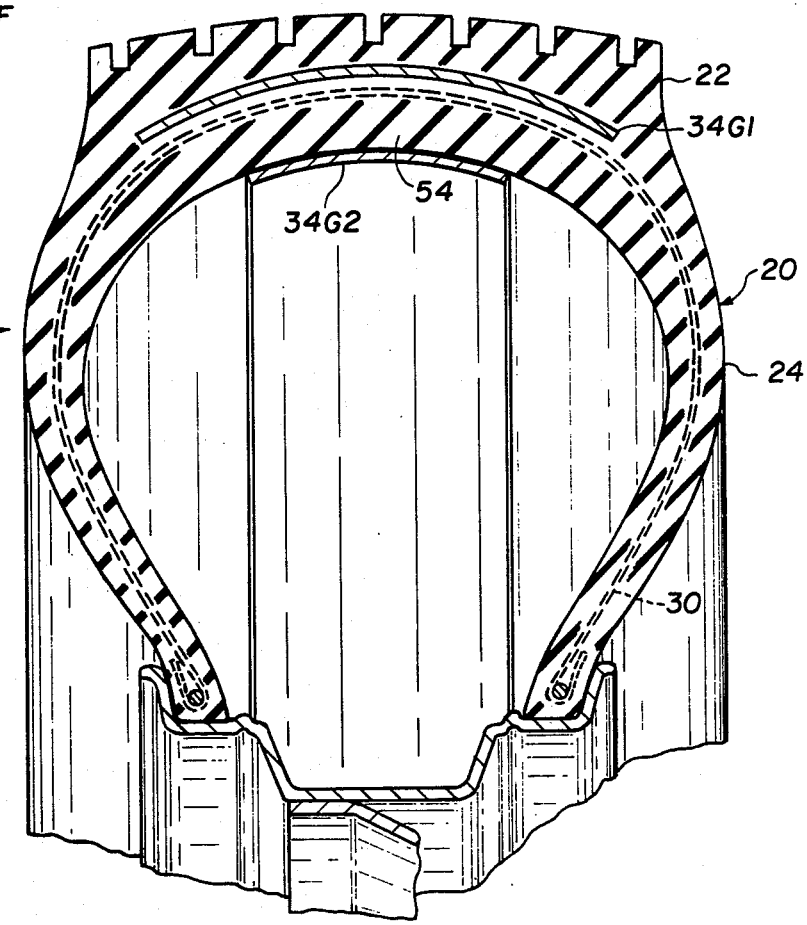
FIG. 12 is a sectional view of an embodiment of the tire of the invention showing in fragmentary section a wheel with which the tire is adapted to be used.

An alternate arrangement of the multiple-band compression element is embodied in tire 10G illustrated in FIG. 12. As shown, tire 10G is similar in construction to tire 10 embodied in FIG. 1 except that, not only does tire 10G have an annular band 34G1 that is similar to band 34 of tire 10, but it also has an inner annular band 34G2 bonded in the inside periphery of the casing 20. In operation, annular bands 34G1 and 34G2 and the portion 54 of the casing therebetween, behave in a manner equivalent to that of compression element 34F of tire 10F (FIGS. 9-11). It will be noted that inner band 34G2 is narrower in width than the outer band 34G1; however, the inner band can be of the same width or even wider than the outer band should design considerations so dictate.

The tire of my invention has a characteristic that I believe is unique in tires of this class. In conventional "run-flat" tires, the "spring rate" of the tire itself goes up when the tires are deflated, giving an increased harshness in the ride and creating potential problems in handling. In the tire of my invention, the spring rate of the tire goes down when the tire is depressurized. For example, when a conventional run-flat tire is depressurized, its spring rate goes up to about 2600 lbs./in.; when the tire of this invention is depressurized, its spring rate goes down to about 550 lb./in. (the spring rate at normal inflation pressures is about 1000-1200 lb./in.).

Although shown and described in what is believed to be the most practical and preferred embodiments, it is apparent that departures from the specific apparatus described will suggest themselves to those skilled in the art and may be made without departing from the spirit and scope of the invention. I, therefore, do not wish to restrict myself to the particular constructions illustrated and described, but desire to avail myself of all modifications that may fall within the scope of the appended claims.

Having thus described my invention, what I claim is:

1. In a pneumatic tire having a casing with a tread portion in the crown thereof, sidewalls extending from said crown on either side to annular bead portions on the inner periphery on each side of the tire, said beads being adapted to mount said tire on the rim of a wheel, that improvement therein which comprises:

a resilient annular element having at least one solid relatively thin annular band of high-strength material fixed in said tire radially inwardly of said tread protion, said annular band having a width substantially spanning the width of said crown, said annular band behaving as a supple tensile member when said tire is operated in a pressurized condition and acting as a structural flexible-arch compression member wherein said arch configuration allows coacting tension loads in the sidewalls to act over a substantial portion of the circumference of the sidewalls when stabilized in unpressurized operation; and means to radially stabilize said annular element, said means comprising a multiplicity of closely spaced substantially radial spoke-like reinforcing elements having freedom in shear with respect to one another in said sidewalls connected to said beads and extending therefrom at least to the crown region of said tire and being operatively connected to said annular element with the loads therebetween being transmitted at least in part by said casing, whereby said relatively thin radially stabilized annular element can support the unpressurized tire for operation underload.

2. A pneumatic tire as defined in claim 1 wherein the design parameters thereof have the relationship $$(r^4 K_s / E_b I_b C_b) = M$$

in which:
$M$ = 10–100
$r$ = Outside radius of the undeflected tire
$K_s$ = Radial spring rate equivalent of the unpressurized sidewall in lbs./in.
$E_b$ = Modulus of elasticity of the annular element
$I_b$ = Moment of inertia of the annular element
$C_b$ = Circumference of the annular element.

3. A pneumatic tire as defined by claim 1 wherein the spring rate thereof at normal inflation pressure ranges from about 1000 to 1200 pounds per inch and at zero inflation pressure the spring rate is about 550 pounds per inch.

4. In a pneumatic tire:
a casing having a crown, sidewalls, and annular bead portions, said sidewalls extending from said crown on either side thereof to said annular bead portions, said bead portions being adapted to mount said tire on the rim of a wheel;
a solid resilient annular element fixed in said tire in the crown region thereof, said annular element extending substantially from sidewall to sidewall;
means to stabilize said annular element, said means comprising a multiplicity of substantially radial spoke-like reinforcing elements having freedom in shear with respect to one another in said sidewalls, said radial elements being in close proximity in the crown of said tire to said annular element and operatively connected thereto at least in part through said casing, whereby when said tire is operated underinflated said annular element functions as a structural flexible-arch compression member wherein said arch configuration allows coacting tension loads in the sidewalls to act over a substantial portion of the circumference of the sidewalls.

5. A pneumatic tire as defined in claim 4 wherein the tire when unpressurized has a ratio of radial to annular stiffness in the range between about 10 and about 100.

* * * * *